United States Patent

Beery et al.

[15] 3,654,816

[45] Apr. 11, 1972

[54] SCREW ENGAGING DEVICE

[72] Inventors: Jack Beery, Farmington; Zong-Shyong Luo, Plymouth, both of Mich.

[73] Assignee: Burroughs Corporation, Detroit, Mich.

[22] Filed: Dec. 1, 1970

[21] Appl. No.: 94,107

[52] U.S. Cl. .................................................. 74/424.8 R, 74/459
[51] Int. Cl. .............................................. F16h 1/18, F16h 55/22
[58] Field of Search .................... 74/459, 424.6, 424.7, 424.8

[56] References Cited

UNITED STATES PATENTS 2,443,020    6/1948    Beier ........................................ 74/459

*Primary Examiner*—Leonard H. Gerin
*Attorney*—Kenneth L. Miller and Edwin W. Uren

[57] ABSTRACT

A device for controllably engaging the helical thread of a screw wherein a spring member is disposed concentrically about a portion of the outer diameter of the screw in substantial alignment with the helical thread thereof, one end of the spring member being rotatably restrained by a support and the other end of the spring member being bidirectionally rotatable about the screw for diametrically contracting and dilating the spring member into and out of engagement with the helical thread of the screw.

10 Claims, 5 Drawing Figures

PATENTED APR 11 1972　　3,654,816

INVENTORS
JACK BEERY
ZONG S. LUO

BY Edwin W Uren
AGENT

SCREW ENGAGING DEVICE

BACKGROUND OF THE INVENTION

This invention relates generally to devices for engaging screws and more particularly concerns devices that are controllably engageable with a driven screw.

In most applications where a member is driven by a rotatable screw, it is necessary that a provision be made for permitting movement of the member in both axial directions along the screw. If the member, for example, serves to bias a stack of cards against a feed roller, as in a card feeding apparatus, it is necessary after driving the member forward in constant abutment with the diminishing stack to move the member back away from the feed roller to permit a new stack of cards to be inserted between it and the biasing member. Another common example of the need for moving a screw-driven member in both axial directions is in a printing apparatus where a print element must be tabulated and returned. Perhaps the most obvious way of achieving such a bidirectional function is to connect the movable member to the screw by means of a common nut, then by providing for bidirectional rotation of the screw the desired result is achieved. The screw in such configuration would have to be driven by a reversible motor, and if it is desired that movement in one direction proceed more rapidly than the other, the motor would also have to provide an increased speed in the one direction. To obviate the requirement for reversible screw drive means, prior art mechanisms have utilized, among other devices, a fractional portion of a nut to drivably connect the member with the screw, wherein the fractional nut is held in engagement with the driven screw, such as by the weight of the member. The member is then disengageable from the screw by merely lifting it therefrom. The member may then be moved manually, or by any other means to a desired axial position and then dropped back into engagement with the screw. Such a device requires a means to guide and laterally support the member in its movement along the screw, since the fractional nut itself does not provide these functions.

The present invention has an object therefore, to provide a device for efficiently engaging and disengaging a member respectively with and from a unidirectionally driven screw to permit bidirectional movement of the member along the screw.

It is also an object of the present invention to effect engagement and disengagement of the screw by a simple movement of the member itself.

It is another object of the present invention to laterally support and guide the member along the screw.

It is more specifically an object of the invention to adapt the property of diametric variation of a torsionally strained spring for use in a screw engaging device.

It is a related object of the invention to provide a housing for the diametrically variable spring the permits simple construction of the device and easy maintenance thereof.

It is similarly an object of the invention to provide a housing that establishes a limit to diametric expansion of the spring.

It is still another object of the invention to provide a screw engagement device in combination with a particular type of screw in which the engaged device is ratchetable in one direction along the screw.

It is finally an object of the present invention to utilize a diametrically variable spring member in combination with a screw to provide a simple and efficient card stack biasing mechanism.

SUMMARY OF THE INVENTION

In accordance with the invention, a stationary support is positioned longitudinally in alignment with a helically threaded screw for rotatably restraining and longitudinally guiding a static end of a spring member. A body section of the spring member is wrapped concentrically about a portion of the screw in substantial alignment with the helical thread thereof. A reaction end of the spring member is then bidirectionally rotatable in an arc about the screw to diametrically contract or dilate the body section of the spring member.

BRIEF DESCRIPTION OF THE DRAWINGS

To facilitate a more complete understanding of the invention, a preferred embodiment thereof will hereinafter be described in connection with the drawings in which.

DETAILED DESCRIPTION OF THE INVENTION

Figure 5:
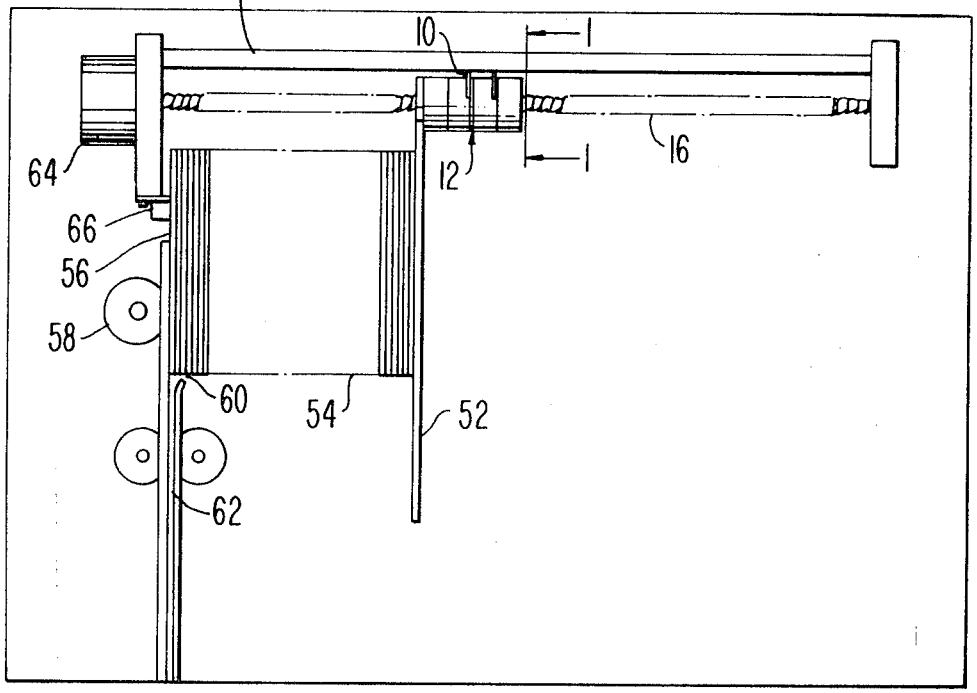
FIG. 5 illustrates the preferred device employed in a document stack biasing mechanism of a document feeder.

Turning now to the drawings wherein like reference characters designate identical elements in each of the drawings, and particularly to FIGS. 1–4, there is shown a spring member 10 carried within a sectional housing 12. Body sections 14 of the spring member are concentrically disposed in axial separation along a helically threaded screw 16. A static end 18 of the spring member 10 is slidably engaged by a longitudinal slot 20 in a stationary support 22 that rotatably restrains the static end of the spring member while permitting longitudinal motion thereof. The static end 18 of the spring member 10 extends through slots 24 in the housing 12 so that the static end does not interfere with rotation of the housing about the helically threaded screw 16. A reaction end 26 of the spring member 10 is rigidly held interiorly of the housing 12 so that rotation of the housing about the screw carries with it the reaction end of the spring member while the static end 18 is held rotatably motionless by the stationary support 22.

As shown in the drawings, when the housing 12 is rotated in a counterclockwise arc about the screw 16 the body sections 14 of the spring member 10 diametrically contract into engagement with the thread of the screw. Conversely, when the housing 12 is rotated clockwise the body sections 14 dilate, thus disengaging from the screw 10. The property of diametric variation of a torsionally strained spring member, as described, may be illustrated by the following mathematical approximation of diametrical variation:

$$\Delta D = L/n_0\pi - L/n_1\pi$$

where:

$\Delta D$ = the average diametric variation measured axially along the spring $L$ = the length of the spring (a constant)

Figure 2:
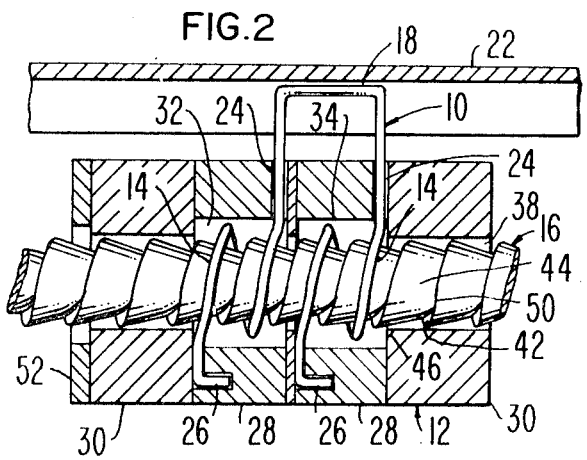
FIG. 2 is a modified section view taken through line 2—2 of FIG. 1.
Figure 4:
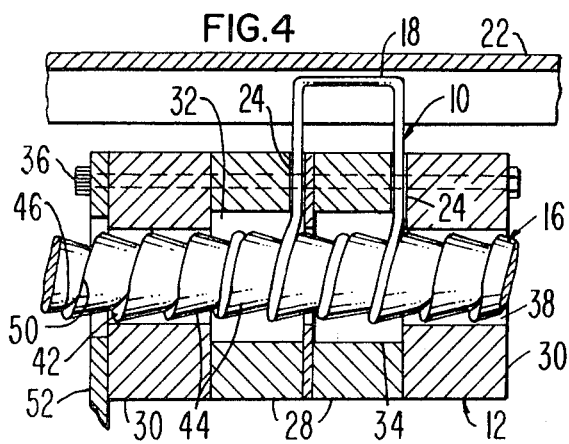
FIG. 4 is a view similar to FIG. 2 showing the spring member engaged with the screw.

$n_0$ = the number or fraction of spiralled coils of the unstrained spring $n_1$ = the number or fraction of spiralled coils of the strained spring It will be noted in FIG. 2 that there is a slight change in the distance of the body section 14 of the spring member 10 from the periphery of the screw 16 along the axial dimension of the screw. The closer the body section 14 of the spring member 10 gets to the reaction end 26, the closer it comes to the periphery of the screw 16. Such a configuration is necessary to compensate for the variation in diametric contraction and expansion that the spring member 10 undergoes when the reaction end 26 is torsionally displaced. This variation is compensated for by axially varying the diameter of the unstrained spring member 10, as shown in FIG. 2, to a degree that will compensate for the predetermined diametric variation in the strained spring.

As illustrated in FIG. 2, the body section 14 of the unstrained spring member 10 is substantially aligned with the helical thread of the screw 16. Although there is a slight change of pitch of the body section 14 of the spring member 10 under a torsional strain, this change is too small to meaningfully depict in the drawings.

The housing 12 of the preferred device is sectionally constructed of two cylindrical spring retaining sections 28 and two annular bearing sections 30. To limit the dilation of the body sections 14 of the spring member 10 an annular opening 32 in each of the spring retaining sections 28 has a diameter substantially larger than the contracted diameter of the spring member 10. The inner wall 34 of each annular opening 32 establishes a limit of diametric dilation and, consequently, of rotation for the housing 12 about the screw 16. The two annular bearing sections 30 of the housing 12 sandwich the spring retaining sections 28 therebetween. All four of the sections are joined by two fasteners 36 axially disposed through the housing 12. The annular opening 38 of each bearing section 30 is only slightly larger than the outside diameter of the screw 16 so that the bearing sections concentrically position and laterally support the housing 12 with respect to the screw, thus maintaining the body sections 14 of the spring member 10 in concentric relationship with the screw while also permitting the housing to be axially translated along the screw.

In accordance with a further aspect of the invention the helical thread of the screw 16 is so designed that the spring member 10 and housing 12 is slidable or ratchetable in one direction along the screw while being substantially resistent to movement in the other direction. This particular property arises from the shape of the thread as formed by two surfaces thereof. A first of these surfaces is disposed in substantially perpendicular relationship with the axis of the screw and forms a helical ridge 42 thereabout. A second surface 44 projects in acute inclination to the axis of the screw 16 from the innermost portion 46 of this ridge 42 to a junction with the outermost portion of the next axially separated ridge, the junction thus forming a maximum outer diameter for the screw, or a rib 50. The diametrically resilient spring member 10 is then slidable or ratchetable in one axial direction by dilatorily camming over the acutely inclined surface 44 of the thread, but in the other direction the normal surface or ridge 42 of the thread provides no camming action, thus movement in that direction is resisted. The advantage of this feature in one particular use will hereinafter be pointed out.

The axial thrust imparted by the rotating screw 16 to the spring member 10 is related to several factors which can be varied according to the particular needs of the user. It is apparent that the greater the number of turns that the body section 14 makes around the screw 16, the greater the axial thrust imparted thereby. However, the number of turns that can be efficiently utilized is limited by the axial varience in diameter of a torsionally strained spring body, as heretofore described. The amount of torsional rigidity of the body section 14 of the spring member 10 also affects the axial thrust that may be imparted to it by a screw 16. It follows that a body section 14 of a spring member 10 with high torsional rigidity would tend to remain engaged with the thread of the screw 16 under a higher axial load.

An application for which the preferred screw engaging device is particularly suited is in engageably and disengageably coupling a document stack biasing member 52 of a document feeder to a driven screw 16. As shown in FIG. 5, the document stack biasing member 52 presses against the back of a document stack 54, thus maintaining the forward part 56 of the stack 54 against a document feeding roller 58 that removes the forward document from the stack 54 toward an opening 60 of a guideway 62. The document stack biasing member 52 is rigidly connected to the cylindrical housing 12. A motor 64 for rotating the screw 16 and consequently for axially translating the cylindrical housing 12 and the attached biasing member 52 toward feed roller 58 is started and stopped in response to pressure applied by the forward document of the stack 54 against a switch 66. The switch 66 shuts off the motor 64 and consequently stops the forward translation of the biasing member 52 whenever the forward pressure on the stack 54 exceeds an amount determined by the closing force of the switch 66. Thus, as the document stack 54 diminishes in size, the motor 64 that drives the screw 16 turns off and on in response to the pressure applied by the biasing member 52 to the stack, so that the forward part of the stack is maintained within a predetermined range of pressure against the feed roller 58.

Figure 1:
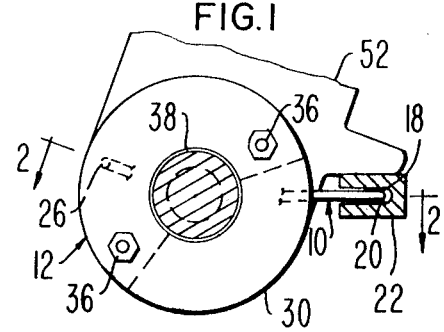
FIG. 1 is an end view of the preferred device.
Figure 3:
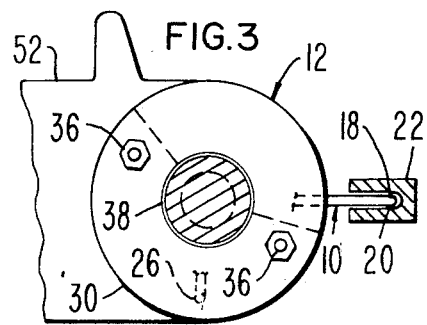
FIG. 3 is a view similar to FIG. 1 showing the reaction end of the spring member rotated to engage the body section of the spring member with the screw.

As the thickness of the document stack 54 diminishes, and a new stack is ready for placement in the feeder, the document stack biasing member 52 is rotated upwardly, as shown in FIGS. 1 and 2, thus disengaging the body sections 14 of the spring member 10 from the thread of the screw 16. The biasing member 52 may then be moved rearwardly (to the right, as viewed in FIG. 5) to permit insertion of the new card stack between the feed roller 58 and the biasing member 52. The shape of the screw thread and the diametric resiliency of the spring member 10 permits the biasing member 52 and the cylindrical housing 12 to be slid or ratcheted forward (to the left, as viewed in FIG. 5) into abutment with the rear of the card stack 54, so that the biasing member need not be closely aligned with the rear of the stack before lowering the member, nor need an operator wait for the screw 16 to drive the member into the rear of the stack. The stationary support 22 that holds the static end 18 of the spring member 10 also serves as a limit against which the upwardly rotated biasing member 52 may rest. The weight of the biasing member 52 rotating downwardly provides a torsional force on the spring member 10 of sufficient magnitude to diametrically contract the body section 14 thereof into engagement with the helical thread of the screw 16, so that no latching means or the like are required to maintain the spring member in its torsionally strained state.

While the invention has been described in conjunction with a specific embodiment it is evident that many modifications and alternatives not truly departing from the inventive concept residing therein will be apparent to those skilled in the art in light of the foregoing description. Accordingly, it is intended to embrace within the appended claims all such modifications and alternatives that reside within the inventive concept disclosed herein.

What is claimed is:

1. A device for drivably coupling a movable member with a helically threaded screw, said device comprising;
   a stationary support spaced apart from the screw, and
   a spring member having a body section concentrically disposed about the screw in substantial alignment with the helical thread thereof, a static end of said spring member being rotatably restrained and axially guided by said stationary support, and a reaction end of said spring member being coupled with the movable member so that rotation of the movable member in a predetermined arc about the helically threaded screw diametrically contracts the body section of the spring member into drivable engagement with the screw whereas rotation of the movable member about the screw in an arc of opposite direction diametrically dilates the body section of said spring member out of engagement with the screw.

2. A device as defined in claim 1 wherein the body section of said spring member circumscribes at least one revolution of the screw.

3. A device as defined in claim 1 wherein said stationary support has a longitudinal slot aligned with the screw for longitudinally guiding and rotatably restraining the static end of said spring member.

4. A device as defined in claim 1 further including a housing coupled with said spring member for concentrically positioning the body section of said spring member with respect to the helically threaded screw.

5. A device as defined in claim 4 wherein said housing has an annular opening through which the screw projects, said spring member being internally carried by said housing in concentric relationship with said annular opening.

6. A device as defined in claim 5 wherein a predetermined inner diameter of said annular opening establishes an outer limit of diametric dilation of the body section of said spring member.

7. A device as defined in claim 5 wherein a longitudinal portion of said annular opening is formed by an inner cylindrical surface of an annular bearing, said inner cylindrical surface having a diameter slightly greater than the maximum outside diameter of the screw for maintaining said housing and said spring member in concentric relationship with the screw.

8. A device as defined in claim 5 wherein the static end of said spring member extends exteriorly of said housing, the reaction end of said spring member being fixedly carried therein, the movable member thus being connectable to said housing for rotation of said housing in an arc about the screw for diametrically varying the body section of said spring member.

9. A device for drivably coupling a movable member with a helically threaded screw, said device comprising;
- a stationary support spaced apart from said screw, said stationary support having a longitudinal slot aligned with the screw,
- a spring member having two body sections axially separated and in mutually concentric relationship with the screw, the two of said body sections having independent reaction ends and a mutual static end slidably engaged within the slot of said stationary support, and
- a housing fixedly engaging the reaction ends of said spring member and carrying the body sections thereof in concentric relationship with said screw, said housing being connected to said movable member such that bidirectional rotation of said movable member in predetermined respective arcs about the screw diametrically contracts and dilates the body section of said spring member into and out of driving engagement with the screw.

10. A ratchetable driving mechanism comprising;
- an axially rotatable screw having a helical rib disposed about the periphery thereof, said rib being formed by the junction of a first and a second surface, said first surface being in the form of a ridge helically disposed about the screw in substantially normal relationship with the axis of said screw and said second surface being acutely inclined with said axis, and
- a diametrically resilient spring member having a body section concentrically disposed about said screw in abutment with said first surface, whereby rotation of said screw in a first direction axially translates said spring member in abutment with said first surface, said spring member being ratchetably movable in the direction of translation over said second surface but substantially resistent to movement opposite said direction of translation.

* * * * *